United States Patent Office 3,427,257
Patented Feb. 11, 1969

3,427,257
POLYMERIZATION CATALYST CONTAINING
VANADIUM, PHOSPHORUS AND ALUMINUM
John W. Bayer, Perrysburg, and Donald W. Gagnon and
William C. Grinonneau, Toledo, Ohio, assignors to
Owens-Illinois, Incorporated, a corporation of Ohio
No Drawing. Filed June 18, 1965, Ser. No. 465,210
U.S. Cl. 252—431        7 Claims
Int. Cl. B01j 11/32

ABSTRACT OF THE DISCLOSURE

Disclosed herein is a catalyst composition, a method for making it, and a method of polymerization of unsaturated compounds; the catalyst composition contains a primary component (produced by the reaction of a vanadium oxide with an organic phosphorus oxy compound) which is employed in conjunction with an organo-aluminum compound as a cocatalyst.

---

This invention relates to a process for the polymerization of unsaturated compounds. Likewise, the invention is concerned with a catalytic composition of matter and a process for the preparation of the same.

Polymerization processes and catalytic compositions of matter are widely used for the preparation of a diverse range of polymers. These polymeric compositions are widely used, for example in the packaging and construction fields. Specifically, this invention relates to a new process and catalyst system whereby desirable solid polymers can be economically produced.

An object of this invention is to produce a new polymerization process. Other objects of this invention include the development of a new polymerization catalyst and a process for the preparation of said catalyst. More specifically, an object of this invention is an improved process and catalyst system for the polymerization of monomeric compounds, such as ethylene, propylene, styrene, and vinyl chloride.

The polymerization processes and catalyst of this invention are adapted for the preparation of a wide range of polymers. This invention is applicable to the preparation of both homopolymeric and copolymeric compositions, such as (1) vinyl resins formed by the polymerization of vinyl halides or by the copolymerization of vinyl halides with unsaturated poelymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrenes; (2) poly-α-olefins such as polyethylene, polypropylene, polybutylene, and polyisoprene, including copolymers of poly-α-olefins; (3) polystyrene, including copolymers of styrene with monomeric compounds such as acrylonitrile, and butadiene; (4) acrylic resins as exemplified by the polymers of methyl acrylate, acrylamide, methylol acrylamide, acrylonitrile, and copolymers of these with styrene, vinyl pyridines, etc.; (5) neoprene; and (6) unsaturated polyesters. This list is not meant to be limiting or exhaustive but merely to illustrate the wide range of polymeric materials which may be obtained by the present invention.

The process and catalyst of this invention are particularly suited to the preparation of high quality polymers from monomers such as ethylene, propylene, styrene and vinyl chloride.

The primary catalyst of this invention is produced by the reaction of a vanadium oxide of the formula $$V_2O_n$$

wherein n is an integer from 3 to 5, with an organic phosphorous oxy compound of the formula

wherein $R_1$, $R_2$ and $R_3$ are independently members such as hydrogen, hydroxyl, alkyl having from one to eight carbon atoms, alkoxy having from one to eight carbon atoms and aryl, wherein at least one member is an organic group.

The primary catalyst system can be prepared by the reaction of about 1 to about 6 parts by weight of the vanadium oxide with from about 1 to about 6 parts by weight of the organic phosphorus oxy compound. A more preferred composition is produced by the reaction of from about 1 to about 4 parts of the vanadium oxide with from about 1 to about 4 parts of the organic phosphorus oxy compound. A most preferred primary catalytic composition is produced by the reaction of 1 part of vanadium pentoxide with 4 parts of phenyl phosphonic acid.

The primary catalyst system of this invention is produced by the reaction of the vanadium oxide with the organic phosphorus oxy compound at a temperature of from about 80 to about 200° C. for a period of time of from about 1 to about 24 hours in the presence of a solvent such as an aliphatic or aromatic hydrocarbon. Sufficient solvent to slurry the product primary catalyst is usually present. A more preferred range of operating conditions for the preparation of the primary catalyst is from about 50 to about 100° C. for a period of time of from about 5 to about 24 hours. The most preferred primary catalytic composition as described above is produced by the reaction of 1 part vanadium pentoxide with 4 parts of phenyl phosphonic acid in the presence of benzene at a temperature of 80° C. for 24 hours.

It is to be noted that the catalyst of this invention can be prepared by directly reacting the vanadium oxide with the organic phosphorus oxy compound in the absence of a solvent. This hot melt reaction technique is carried out at a temperature of from about 160 to about 200° C. at atmospheric pressure for a period of time of from about 1 minute to about 1 hour. A more preferred set of reaction conditions for this hot melt reaction sequence is 180° C. at atmospheric pressure for 5 minutes.

The above described catalytic composition of matter is utilized in conjunction with a cocatalyst which is represented by the formula

wherein:
$R_1$ is a member such as alkyl having from one to eight carbon atoms and aryl;
$R_2$ is a member such as alkyl having from one to eight carbon atoms, aryl and halogen;
$R_3$ is a member such as alkyl having from one to eight carbon atoms, aryl and halogen.

From about 1 to about 5 parts by weight of the primary catalyst can be utilized with from about 1 to about 10 parts by weight of the cocatalyst of this invention. A more preferred catalytic composition contains from about 1 to about 2 parts of the primary catalyst and from about 1 to about 2 parts of the cocatalyst. The most preferred catalytic composition utilized 5 parts of diethylaluminum chloride as a cocatalyst with 5 parts of the above described preferred primary catalyst.

Polymerization reactions utilizing the catalyst systems of this invention are carried out by the introduction of monomeric material into a reaction vessel while maintaining said reaction vessel at a temperature of from about 0 to about 100° C. and maintaining the pressure at from about atmospheric to about 2,000 p.s.i.g.

It is obvious to one skilled in the art that the optimum reaction conditions for any given monomeric compound depend on the characteristics of said monomeric compound. It is likewise, obvious to one skilled in the art that a polymerization reaction utilizing the process and catalyst of this invention can be carried out on a continuous basis by continuously contacting monomeric material with a catalyst bed. Likewise, the process of this invention can be carried out on a batch basis by charging an autoclave with a fixed amount of a catalyst and a monomeric material.

The polymerization reaction according to this invention is carried out in the presence of a solvent such as an aromatic and aliphatic hydrocarbon. An excess of this solvent is usually present. Sufficient solvent is usually present to allow the formation of a workable slurry with the product polymer.

When a solid polyethylene, polypropylene and polyvinyl chloride are being prepared according to the processes of this invention, it is preferred that the polymerization be carried out at 50° C., at a pressure of from about atmospheric to about 1,000 p.s.i.g., in the presence of heptane for 2 hours.

The following examples will illustrate the preparation of polymeric compositions by means of the subject invention. These examples are given for purposes of illustration and not for purposes of limiting this invention.

EXAMPLE I

A catalyst was prepared by the reaction of 8.4 grams of $V_2O_4$, with 37 grams of phenyl phosphonic acid. The reaction was carried out at a temperature of 80° C., for a period of time of 20 hours at atmospheric pressure, in the presence of 200 grams of benzene.

0.5 gram of the above described catalyst was charged into a polymerization reactor with .48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours, 19 grams of polyethylene was obtained. The melting point of the product polymer was 197–202° C. as determined on a Kofler hot bench.

EXAMPLE II

The preparation of a primary catalyst was carried out by the reaction of 45.5 grams of $V_2O_5$, with 158 grams of phenyl phosphonic acid. This preparatory reaction was carried out at a temperature of 80° C., for a period of time of 48 hours, at atmospheric pressure, in the presence of 200 grams of benzene.

0.5 gram of the above described catalyst was charged into a polymerization reactor with 0.35 gram of ethylaluminum dichloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 21.0 grams of polyethylene was obtained.

EXAMPLE III

By the reaction of 9.1 grams of $V_2O_5$, with 61 grams of dioctyl acid phosphate and 16.4 grams HCl, at a temperature of 80° C., a primary catalyst was prepared. The reaction was allowed to proceed for 20 hours, at atmospheric pressure, in the presence of 220 grams of benzene.

0.5 gram of the above described catalyst was charged into a polymerization reactor with 0.48 gram of diethylaluminum dichloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 4.0 grams of polyethylene was obtained. The melting point of the product polymer was above 260° C.

EXAMPLE IV 45.5 grams of $V_2O_5$ and 158 grams of phenyl phosphonic acid was added to a reactor which was held at a temperature of 80° C. The reaction time was 48 hours, during which time, the reactor was held at atmospheric pressure. The reaction was carried out in the presence of 200 grams of benzene.

0.1 gram of the above described catalyst was charged into a polymerization reactor with .48 gram of diethylaluminum chloride. 500 grams of n-heptane was likewise charged into the reactor. Monomeric ethylene was then introduced into the reactor at a constant pressure of 700–800 p.s.i.g. During the polymerization sequence, the temperature of the reactor was maintained at 57° C. At the end of 2 hours, 215 grams of polyethylene was obtained. The product polymer melted at 140° C. and had a density of 0.930. The melting point was determined by a Du Pont 900 Differential Thermal Analyzer.

EXAMPLE V

A primary polymerization catalyst was prepared by the reaction of 18.2 grams of $V_2O_5$ with 64.4 grams of diethyl ethyl phosphonate and 14.4 grams of water, in the presence of 220 grams of benzene. The reaction was carried out at a temperature of 80° C. for a period of time of 20 hours at atmospheric pressure.

0.5 gram of the above described catalyst was charged into a polymerization reactor with 0.48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 9.5 grams of polyethylene was obtained. The product polymer had a melting point of 190–195° C.

EXAMPLE VI

A catalyst was prepared by the reaction of 9.1 grams of $V_2O_5$ with 61 grams of octylacid phosphate at a temperature of 80° C. for a period of time of 20 hours at atmospheric pressure. The reaction was carried out in the presence of 220 grams of benzene.

0.5 gram of the above described catalyst was charged into a polymerization reactor with 0.48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 2.7 grams of polyethylene was obtained. The melting point of the product polymer was 195–200° C.

EXAMPLE VII

The preparation of a primary catalyst was carried out by the reaction of 45.5 grams of $V_2O_5$ with 158 grams of phenyl phosphonic acid at a temperature of 80° C. The reaction was allowed to proceed for 48 hours at atmospheric pressure in the presence of 200 grams of benzene.

0.5 gram of the above described catalyst was charged into a polymerization reactor with .45 gram of trihexylaluminum. 210 grams of n-heptane was likewise charged into the reactor. Monomeric ethylene was then introduced into the reactor at a constant pressure of 20 p.s.i.g. During the polymeriaztion sequence, the temperature of the reactor was maintained at 57° C. At the end of 2 hours an amount of the order of 1–5 grams polyethylene was obtained.

EXAMPLE VIII

A catalyst was prepared by the reaction of 45.5 grams of $V_2O_5$ with 158 grams of phenyl phosphonic acid at a temperature of 80° C. The reaction was allowed to proceed for 48 hours at atmospheric pressure in the presence of 200 grams of benzene.

0.5 gram of the above described catalyst was charged into a polymerization reactor with .45 gram of triethylaluminum. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 13.5 grams of polyethylene was obtained.

EXAMPLE IX

A catalyst was prepared by the reaction of 45.5 grams of $V_2O_5$ with 158 grams of phenyl phosphonic acid, in the presence of 200 grams of benzene. The reaction was carried out at a temperature of 80° C., for a period of time of 48 hours, at atmospheric pressure.

0.5 gram of the above described catalyst was charged into a polymerization reactor with 0.48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 69.8 grams of polyethylene was obtained. The melting point of the product polymer was 128° C.

EXAMPLE X

A catalyst was prepared by the reaction of 4.5 grams of $V_2O_5$ with 15.8 grams of phenyl phosphonic acid at a temperature of 160° C. for a period of time of ¼ hour, at atmospheric pressure.

0.5 gram of the above described catalyst was charged into a polymerization reactor with 0.48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours 3.0 grams of polyethylene was obtained.

EXAMPLE XI

A polymerization catalyst was prepared by the reaction of 8.4 grams of $V_2O_4$ with 37 grams of phenyl phosphonic acid. This preparatory reaction was carried out at a temperature of 80° C., for a period of time of 20 hours, at atmospheric pressure, in the presence of 200 grams of benzene.

0.5 gram of the above described catalyst was charged into a polymeriaztion reactor with .48 gram of diethylaluminum chloride. Monomeric propylene was introduced into the reactor at a constant pressure of 20 p.s.i.g. During the polymerization sequence, the temperature of the reactor was maintained at 57° C. The polymerization was carried out in the presence of 210 grams of n-heptane. At the end of 2 hours trace amounts of polypropylene was obtained.

EXAMPLE XII

A primary catalyst was prepared by the reaction of 18.2 grams of $V_2O_5$ with 63.2 grams of phenyl phosphonic acid. The reaction was performed at a temperature of 80° C., for a period of time of 20 hours, at atmospheric pressure, in the presence of 220 grams of benzene.

0.5 gram of the above described catalyst was charged into a polymerization reactor with 0.48 gram of diethylaluminum chloride. 110 grams of benzene was likewise charged into the reactor. 22.6 grams styrene was then introduced into the reactor at atmospheric pressure. During the polymerization sequence, the temperature of the reactor was maintained at 60° C. At the end of 2 hours, 1.0 gram of polystyrene was obtained.

EXAMPLE XIII 0.5 gram of a primary catalyst was charged into a polymerization reactor with 0.48 gram of diethylaluminum chloride. The primary catalyst was prepared by the reaction of 18.2 grams of $V_2O_5$ with 63.2 grams of phenyl phosphonic acid. The primary catalyst was prepared by reacting these components at a temperature of 80° C. for a period of time of 20 hours, at atmospheric pressure, in the presence of 220 grams of benzene.

110 grams of benzene was likewise charged into the polymerization reactor. 16.2 grams monomeric acrylonitrile was then introduced into the reactor which was held at atmospheric pressure. During the polymerization sequence, the temperature of the reactor was maintained at 60° C. At the end of 2 hours 2.0 grams of polyacrylonitrile was obtained.

EXAMPLE XIV

A catalyst was prepared by the reaction of 45.5 grams of $V_2O_5$ with 158 grams of phenyl phosphonic acid at a temperature of 80° C. The reaction was allowed to proceed for 48 hours at amospheric pressure. 200 grams of benzene was present.

0.5 gram of the above described catalyst was charged into a polymerization reactor with 0.48 gram of diethylaluminum chloride and 2.0 ml. tetrahydrofuran. 210 grams of n-heptane was likewise charged into the reactor. Monomeric vinyl chloride was then introduced into the reactor at a constant pressure of 20 p.s.i.g. During the polymerization sequence, the temperature of the reactor was maintained at 57° C. At the end of 2 hours, 1.0 gram of polyvinyl chloride was obtained.

EXAMPLE XV

A primary catalyst was prepared by the reaction of 18.2 grams of $V_2O_5$ with 63.2 grams of phenyl phosphonic acid. This reaction was carried out at a temperature of 80° C., for a period of time of 20 hours, at atmospheric pressure, in the presence of 220 grams of benzene.

0.5 gram of the above described catalyst was charged into a polymerization reactor along with 0.48 gram of diethylaluminum chloride. 110 grams of benzene was likewise present in the reactor. 22.6 grams of monomeric divinyl benzene was then introduced into the reactor which was held at atmospheric pressure. During the polymerization sequence, the temperature of the reactor was maintained at 60° C. At the end of 2.0 hours, 2.0 grams of polydivinyl benzene was obtained.

EXAMPLE XVI

A primary catalyst was prepared by the reaction of 7.3 grams of $V_2O_5$ with 25.3 grams of phenyl phosphonic acid at a temperature of 80° C. This preparatory reaction was allowed to proceed for 20 hours, at atmospheric pressure, in the presence of 194 grams of benzene.

0.5 gram of the above described catalyst was charged into a polymerization reactor with 0.48 gram of triethylaluminum. 210 grams of heptane was likewise charged into the reactor. Monomeric butadiene was then introduced into the reactor at a constant pressure of 20 p.s.i.g. During the polymerization sequence, the temperature of the reactor was maintained at 57° C. At the end of 2 hours, 3.0 grams of polybutadiene was obtained.

EXAMPLE XVII

A catalyst was prepared by the reaction of 18.2 grams of $V_2O_5$ with 15.8 grams of phenyl phosphonic acid at a temperature of 80° C. The reaction was carried out for 20 hours, at atmospheric pressure, in the presence of 200 grams of benzene.

0.5 gram of the above described catalyst was charged into a polymerization reactor with 0.48 gram of diethylaluminum chloride. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours, 52.3 grams of polyethylene was obtained. The melting point of the product polymer was 207° C.

EXAMPLE XVIII

A catalyst was prepared by the reaction of 7.3 grams of $V_2O_5$ with 25.3 grams of benzene phosphonic acid at a temperature of 80° C., for a period of time of 22 hours, at atmospheric pressure. The reaction was carried out in the presence of 176 grams of benzene.

0.5 gram of the above described catalyst was charged into a polymerization reactor with 0.5 gram of triphenylaluminum. 210 grams of n-heptane was likewise charged into the reactor. Monomeric ethylene was then introduced into the reactor at a constant pressure of 20 p.s.i.g. During the polymerization sequence, the temperature of the reactor was maintained at 57° C. At the end of 2 hours, 0.8 gram of polyethylene was obtained.

What is claimed is:

1. A catalytic composition of matter comprising (I) from about 1 to about 5 parts of the reaction product, at a temperature in the range from 50° to 200° C. of a vanadium compound represented by the formula $$V_2O_n$$

wherein $n$ is an integer from 3 to 5, and an organic phosphorus oxy compound represented by the formula $$R_2-\underset{\underset{R_3}{|}}{\overset{\overset{R_1}{|}}{P}}=O$$

wherein $R_1$, $R_2$ and $R_3$ are independently hydrogen, hydroxyl, alkyl having from one to eight carbon atoms alkoxy having from one to eight carbon atoms or aryl, wherein at least one member is an organic group, and (II) from about 1 to about 10 parts of a cocatalyst selected from the group consisting of $$\underset{\underset{R_3}{|}}{\overset{\overset{R_1}{|}}{Al}}-R_2$$

wherein:
$R_1$ is alkyl having from one to eight carbon atoms or aryl;
$R_2$ is alkyl having from one to eight carbon atoms, aryl or halogen;
$R_3$ is alkyl having from one to eight carbon atoms, aryl or halogen.

2. A catalytic composition of matter comprising (I) from about 1 to about 5 parts of a primary catalyst which is produced by the reaction of from about 1 to about 6 parts of a vanadium oxide represented by the formula $$V_2O_n$$

wherein $n$ is an integer from 3 to 5, and from about 1 to about 6 parts of an organic phosphorus oxy compound represented by the formula $$R_2-\underset{\underset{R_3}{|}}{\overset{\overset{R_1}{|}}{P}}=O$$

wherein $n$ is an integer from 3 to 5, and from about hydroxyl, alkyl having from one to eight carbon atoms, alkoxy having from one to eight carbon atoms or aryl, wherein at least one member is an organic group, at a temperature in the range from 50 to 200° C., and (II) from about 1 to about 10 parts of a cocatalyst represented by the formula $$\underset{\underset{R_3}{|}}{\overset{\overset{R_1}{|}}{Al}}-R_2$$

wherein:
$R_1$ is alkyl having from one to eight carbon atoms or aryl;
$R_2$ is alkyl having from one to eight carbon atoms, aryl or halogen;
$R_3$ is alkyl having from one to eight carbon atoms, aryl or halogen.

3. A catalytic composition of matter according to claim 2 comprising 5 parts of the reaction product of 1 part of vanadium pentoxide and 4 parts of phenyl phosphonic acid; and 5 parts of diethylaluminum chloride cocatalyst.

4. A catalytic composition of matter according to claim 2 wherein at least one of $R_1$, $R_2$, and $R_3$ in the compound represented by the formula $$R_2-\underset{\underset{R_3}{|}}{\overset{\overset{R_1}{|}}{P}}=O$$

is aryl.

5. A catalystic composition of matter according to claim 2 wherein said organic phosphorus oxy compound is phenyl phosphonic acid.

6. A composition according to claim 4 wherein said vanadium oxide is vanadium pentoxide.

7. A composition of claim 5 wherein said vanadium oxide is vanadium pentoxide.

References Cited

UNITED STATES PATENTS

| | | | |
|---|---|---|---|
| 2,866,732 | 12/1958 | Hoff et at. | 260—429 XR |
| 3,068,259 | 12/1962 | Hartle | 260—429 |
| 3,234,383 | 2/1966 | Barney | 252—431 XR |
| 3,290,342 | 12/1966 | Stern et al. | 260—429 |
| 3,377,325 | 4/1968 | Loveless | 252—431 XR |

PATRICK P. GARVIN, *Primary Examiner.*

U.S. Cl. X.R.

260—88.7, 92.8, 94.9

UNITED STATES PATENT OFFICE
CERTIFICATE OF CORRECTION

Patent No. 3,427,257                                                       February 11, 1969

John W. Bayer et al.

It is certified that error appears in the above identified patent and that said Letters Patent are hereby corrected as shown below:

Column 8, line 5, cancel "wherein n is an integer from 3 to 5, and from about" and insert -- wherein $R_1$, $R_2$ and $R_3$ are independently hydrogen --.

Signed and sealed this 31st day of March 1970.

(SEAL)
Attest:

Edward M. Fletcher, Jr.                                WILLIAM E. SCHUYLER, JR.
Attesting Officer                                                  Commissioner of Patents